(12) United States Patent
Rai et al.

(10) Patent No.: US 7,565,077 B2
(45) Date of Patent: ***Jul. 21, 2009

(54) MULTIPLE EXPOSURE REGIONS IN A SINGLE FRAME USING A ROLLING SHUTTER

(75) Inventors: Barinder Singh Rai, Surrey (CA); Phil Van Dyke, Surrey, CA (US)

(73) Assignee: Seiko Epson Corporation, Tokyo (JP)

( * ) Notice: Subject to any disclaimer, the term of this patent is extended or adjusted under 35 U.S.C. 154(b) by 610 days.

This patent is subject to a terminal disclaimer.

(21) Appl. No.: 11/419,280

(22) Filed: May 19, 2006

(65) Prior Publication Data

US 2007/0269200 A1 Nov. 22, 2007

(51) Int. Cl.
*G03B 41/00* (2006.01)
*H04N 3/14* (2006.01)

(52) U.S. Cl. ...................... 396/335; 348/296

(58) Field of Classification Search ................ 396/213, 396/234, 249, 250, 322, 332, 335, 452; 348/218.1, 348/262, 296

See application file for complete search history.

(56) References Cited

U.S. PATENT DOCUMENTS

| 6,529,242 | B1 * | 3/2003 | Panicacci | 348/308 |
| 6,580,454 | B1 * | 6/2003 | Perner et al. | 348/302 |
| 6,847,398 | B1 * | 1/2005 | Fossum | 348/296 |
| 6,856,349 | B1 | 2/2005 | Trevino | |
| 2002/0071045 | A1 | 6/2002 | Chen | |
| 2003/0151689 | A1 | 8/2003 | Murphy | |
| 2005/0046708 | A1 | 3/2005 | Lim et al. | |

OTHER PUBLICATIONS

Adaptive Image Data Fusion for Consumer Devices Application, Alessandro Capra, Alfio Castorina, Paolo Vivirito and Sebastiano Battiato, Italy, 2004 IEEE 6th Workshop on Multimedia Signal Processing, Sep./Oct. 2004, (pp. 243-246).
In-Pixel Autoexposure CMOS APS, Orly Yadid-Pecht and Alexander Belenky, IEEE Journal of Solid-State Circuits, vol. 38, No. 8, Aug. 2003, (pp. 1425-1428).
Low Power Global Shutter CMOS Active Pixel Image Sensor With Ultra-High Dynamic Range, Alexander Fish, Alexander Belenky and Orly Yadid-Pecht, The VLSI Systems Center, Ben-Gurion University, Beer-Sheva, Israel and Dept. of Electrical and Computer Engineering, University of Calgary, Alberta, Canada, 2004 IEEE, Dec. 2004, (pp. 149-152).

\* cited by examiner

*Primary Examiner*—Rodney E Fuller (57) ABSTRACT

A method for obtaining an image having a plurality of exposure regions is described. The method includes exposing first and second regions of an image sensor, reading out first image data from the first region, pausing a clock signal to the image sensor after the reading out of the first image data, resuming the clock signal to the imaging module, and reading out second image data from the image sensor for the second region of the image. A graphics controller and imaging device for capturing images having multiple exposure regions are also described.

16 Claims, 4 Drawing Sheets

MULTIPLE EXPOSURE REGIONS IN A SINGLE FRAME USING A ROLLING SHUTTER

BACKGROUND

The typical image sensor in digital cameras includes a two-dimensional array of light sensors, each corresponding to one pixel of an image. Each light sensor develops an electrical charge in response to light. The brighter the light and the longer the exposure, the more charge is built up. Image data is generated by digitizing and reading out the charges of all the light sensors in the image array. After generating the image data, the sensors are reset by passing the built-up electrical charges to ground, which is referred to as resetting the sensors.

Typical exposure times for film-based and digital cameras having mechanical shutters for still images of well-lit scenes can extend from $\frac{1}{250}$th of a second to $\frac{1}{60}$th of a second. However, there are many instances where a longer exposure time is desirable to highlight movement, or to capture a particular scene or event. An exposure time of one-half second can emphasize the speed of an object in relation to its surroundings. If a scene has low lighting conditions, a longer exposure time can enhance dim objects in the scene.

In the case of film-based cameras as well as digital cameras with mechanical shutters, an image having a long exposure is created by simply opening a mechanical shutter for an extended period of time, as selected by the user or automatically in response to lighting conditions. In digital cameras, the charge present in each light sensor is digitized after the exposure period, i.e., when the shutter closes. However, many lower-cost cameras and video cameras do not have a mechanical shutter and instead rely on a rolling shutter, which is an implementation of an electronic shutter.

In an electronic shutter, releasing a light sensor from reset, thereby allowing the corresponding electrical charge to build up, is equivalent to opening a mechanical shutter for that sensor. In a rolling shutter, multiple rows may be released from a reset condition at a time. While some rows are "exposed" by releasing them from reset, image data is read from a previously exposed row of sensors. After the last row of sensors is read, the process may be repeated to capture a new image frame.

For cameras having electronic shutters, exposure times may be varied by changing the number of rows of sensors that are exposed at any one time and by modifying the read-out clock speed, which affects the speed with which each successive row of sensors is read-out. The faster the read-out clock speed, the less time it takes a row of pixels to be read-out, and the sooner successive rows are read-out. This results in less exposure time for each row of sensors.

To satisfy the insatiable desire to provide new and better features in electronic imaging devices, it would be desirable to allow a user to enhance the use of the electronic shutter by providing imaging features not possible with a mechanical shutter, such as imaging some regions of an image with a longer exposure time, and other regions with a shorter exposure time.

SUMMARY

Broadly speaking, the present invention fills these needs by providing a graphics controller and imaging device having functionality to provide a plurality of exposure regions each having a different exposure period in a single image frame. It should be appreciated that the present invention can be implemented in numerous ways, including as a process, an apparatus, a system, a device, or a method. Several inventive embodiments of the present invention are described below.

In one embodiment, a method for obtaining an image having a plurality of exposure regions is provided. The method includes reading out first image data from an imaging module for a first region of the image, pausing a clock signal to the imaging module after the reading out of the first image data, resuming the clock signal to the imaging module, and reading out second image data from the imaging module for a second region of the image.

In another embodiment, a graphics controller for obtaining an image having a plurality of exposure regions is provided. The graphics controller includes registers for holding values identifying exposure times for a first region of the image and a second region of the image, a clock generating a clock signal, a camera interface for reading out image data from the imaging module, and exposure logic. The clock signal is provided to the imaging module during image read-out. The exposure logic pauses the clock signal after reading out image data for the first region and resumes the clock signal at an appropriate time in accordance with the exposure times. The pausing and resuming is responsive to the values held by the registers and causes each of the first and second region to have the exposure times identified by the values in the registers. The camera interface reads out image data from the imaging module for the second region of the image when the clock signal is resumed.

In yet another embodiment, an imaging device is provided. The imaging device includes a graphics controller having a plurality of registers, an imaging module, a user interface, a host central processor unit (CPU), and a memory. The host CPU receives user input via user interaction with the user interface. The user input designates exposure times for first and second exposure regions. The first and second exposure regions correspond to portions of an image to be captured. The host CPU stores values corresponding to the exposure times in registers of the graphics controller. The graphics controller further includes a clock for generating a clock signal, a camera interface, and exposure logic. The clock signal is provided to the imaging module during image data read-out. The camera interface reads out image data from the imaging module. The exposure logic pauses the clock signal after reading out image data for the first exposure region and resumes the clock signal after an appropriate period of time in accordance with the exposure times. The pausing and resuming of the clock signal causes each of the first and second exposure regions to have the exposure times as identified by the values in the registers. The image data is then stored in the memory.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
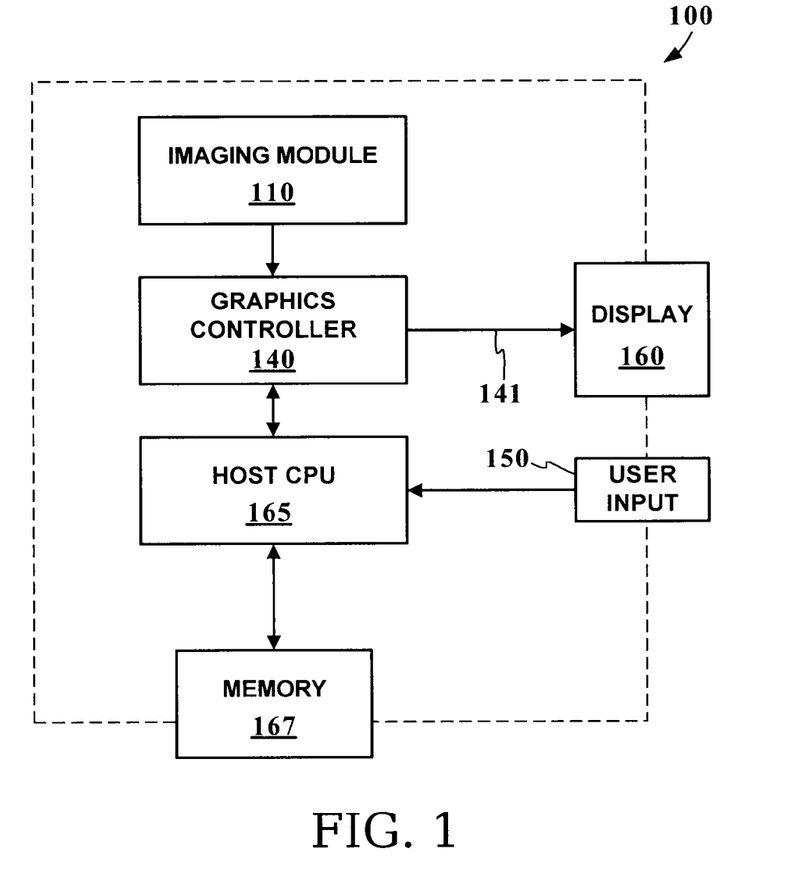
FIG. 1 is a schematic overview of an imaging device.

FIG. 1 is a schematic overview of an imaging device 100. Imaging device 100 may be a digital camera, digital video recorder, or some electronic device incorporating a image capture and video recorder functionality, such as, for example, a personal digital assistant (PDA), cell phone or other communications device. Imaging device 100 includes an imaging module 110, a graphics controller 140, a host central processing unit (CPU) 165, and a display 160.

The timing control signals and data lines, such as line 141 communicating between graphics controller 140 and display 160, are shown as a single line but may in fact be several address, data, and control lines and/or a bus. All communication lines shown in the figures will be presented in this manner except as noted to reduce the complexity and better present various novel aspects of imaging device 100.

Imaging module 110 includes an image sensor positioned adjacent to a lens (not shown) such that light is focused on and forms an image on the sensor, and circuitry for reading out image data from the image sensor to graphics controller 140. The image sensor may be a charge-coupled device (CCD) or complementary metal-oxide semiconductor (CMOS) type image sensor that converts light into electronic signals that represent the level of light at each pixel. Other image sensors that are known or may become known that are capable of converting an image formed by light into electronic signals representative of the image may also be used. Imaging module 110 converts these electronic signals into image data, which is passed to graphics controller 140. Imaging module 110 may have varying resolutions depending upon the application. In one embodiment, the image sensor comprises a two-dimensional array of pixel sensors in which each pixel sensor has a color filter in front of it in what is known as a color filter array (CFA). One common type of CFA is the Bayer filter in which every other pixel has a green filter over it in a checkerboard pattern, with remaining pixels in alternate rows having blue and red filters. Other types of color image sensors are available or may become available that are suitable for use with imaging device 100. In addition, the present invention may also be used with a gray-scale image sensor used for taking black and white (gray-scale) photographs.

Graphics controller 140 receives image data from imaging module 110, and, in accordance with instructions from host CPU 165, can send the image data to display 160 or host CPU 165. Graphics controller 140 may include image processing capabilities such as image compression technology for converting image data received from imaging module 110 into compressed image data, such as, for example, a Joint Photographic Exert Group (JPEG) format. Graphics controller 140 and other hardware devices incorporate logic typically designed using a hardware description language (HDL) or other means known to those skilled in the art of integrated circuit design. The generated circuits will include numerous logic gates and connectors to perform various operations and does not rely on software instructions.

Display 160 can be any form of display capable of displaying an image. In one embodiment, display 160 comprises a liquid crystal display (LCD). However, other types of displays are available or may become available that are capable of displaying a digital image that may be used in conjunction with imaging device 100. In one embodiment, display 160 is not provided to reduce cost or to provide a more compact imaging device. In this case, an optical viewfinder (not shown) may be used instead of display 160 for framing the subject of the image when preparing to take the picture.

Host CPU 165 performs digital processing operations and communicates with graphics controller 140. In one embodiment, host CPU 165 comprises an integrated circuit capable of executing firmware retrieved from memory 167. This firmware provides imaging device 100 with functionality when executed on host CPU 165. Host CPU may also be a digital signal processor (DSP) or other processing device.

Memory 167 may be internal or external random-access memory or non-volatile memory. Memory 167 may be non-removable memory such as flash memory or other EEPROM, or magnetic media. Alternatively, memory 167 may take the form of a removable memory card such as ones widely available and sold under such trademarks as "SD RAM," "COMPACT FLASH," and "MEMORY STICK." Memory 167 may also be any other type of machine-readable removable or non-removable media. Memory 167 may be remote from imaging device 100. For example, memory may be connected to imaging device 100 via a communications port (not shown). For example, imaging device 100 may include a BLUETOOTH® interface or an IEEE 802.11 interface, commonly referred to as "Wi-Fi." Such an interface may connect imaging device 100 with a host (not shown) for uploading image data to the host. If imaging device 100 is a communications device such as a cell phone, it may include a wireless communications link to a carrier, which may then store data in hard drives as a service to customers, or transmit image data to another cell phone or email address. Memory 167 may be a combination of memories. For example, memory 167 may include a removable memory card for storing image data, and a non-removable memory for storing data and firmware executed by host CPU 165.

Host CPU 165 is also in communication with user input device 150. In one embodiment, user input device 150 comprises a keypad. Alternatively, user input device 150 may comprise any number of alternate means, such as a joystick, a remote control, touch-screen, sound or voice activation, etc. User input device 150 may further include a mode selection dial or graphical interface buttons for selecting and/or manipulating items on display 160.

In one embodiment, imaging device 100 can operate in a constant-exposure picture taking mode and varying-exposure picture taking mode. In the constant exposure mode, a photographer may save a single image by orienting imaging device 100 such that a desired image is aligned with the image sensor of imaging module 110. The user interacts with user input 150 to cause a frame of image data to be read out from imaging module 110 at a constant rate. Graphics controller 140 then passes resulting image data to either or both of display 160 and host CPU 165 for storage in memory. As mentioned, imaging module 110 and/or graphics controller 140 may include image processing circuitry or instructions for compressing the image data using an image compression algorithm such as the well known JPEG image format. In one mode of operation, display 160 is continuously updated with an image most recently received by imaging module 110.

When the user desires to send data representing a current image to memory 167, the user will interact with user input device 150 causing an image received by imaging module 110 to be passed to a frame buffer in graphics controller 140, from which host CPU 165 will access and store the image in memory 167. Instead of or in addition to taking single still images, imaging device 100 may be capable of generating a video stream. In this case, graphics controller 140 may receive an image periodically, e.g., 15 times a second, which is then encoded using Moving Picture Experts Group (MPEG) or other encoding technology and stored in memory 167.

In the varying-exposure picture taking mode, the photographer interacts with user input 150 to select varying exposure periods for multiple exposure regions within the frame, and then, frames the subject and interacts with user input 150 to cause a picture of to be taken of the subject. Graphics controller 140 manipulates the clock signals sent to imaging module 110 in a manner to be described in more detail below, causing each region of the frame to be captured with a distinct exposure period.

Figure 2:
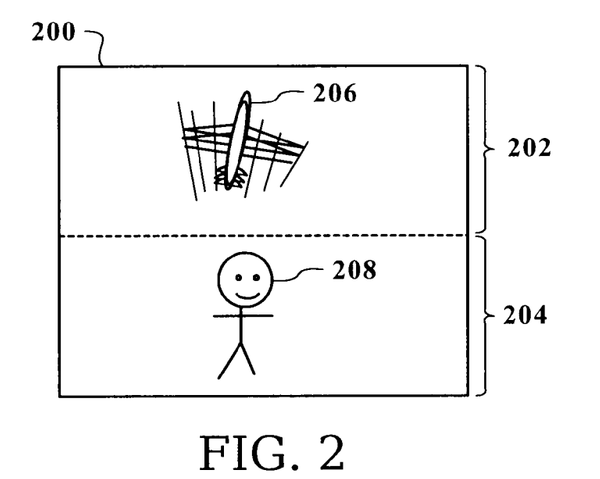
FIG. 2 is an exemplary image having multiple exposure regions.

FIG. 2 is an exemplary image 200 having a first exposure region 202 exposed for a first length of time, and a second exposure region 204 exposed for a second length of time. In this example, first exposure region 202 has a longer exposure period than that of second exposure region 204. This longer exposure period highlights the movement of airplane 206 in first exposure region 202 as it flies over the head of subject 208 in the second exposure region 204. Since the upper portion of the image is exposed for a longer period of time, the gain on either or both portions can be adjusted so that the two regions appear equally bright and there is no obvious border between the two regions. Gain is analogous to an aperture setting in traditional photography.

Figure 3:
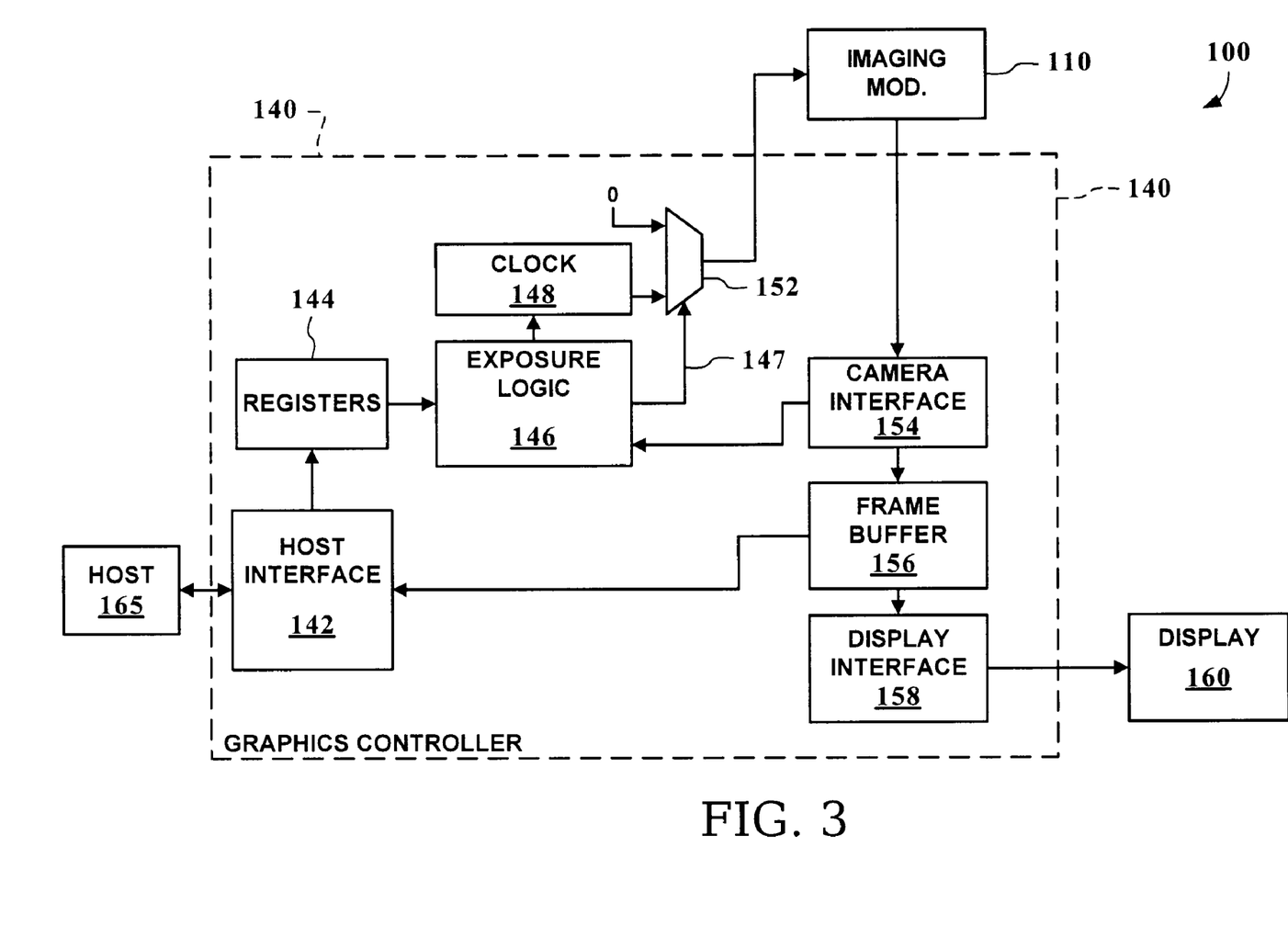
FIG. 3 shows an exemplary graphics controller.

FIG. 3 shows an exemplary graphics controller 140. Graphics controller 140 includes a camera interface 154 in communication with imaging module 110. Camera interface 154 receives image data and stores it into frame buffer 156. Display interface 158, reads frame buffer 156 and interacts with display 160 in a known manner to cause the image to be displayed in display 160. Host interface 142 can also read frame buffer 156 and provide image data to host CPU 165 for storage or other for purposes.

Clock circuit 148 provides clock signals to imaging module 110 via multiplexer 152. When a picture is taken in a constant-exposure mode, exposure logic 146 controls select signal 147 to maintain clock 148 in constant communication with imaging module 110. When a picture is taken in a varying-exposure mode, exposure logic 146, in response to values stored in register 144, controls clock 148 and/or multiplexer 152 to vary and/or pause the clock signals sent to imaging module 110 during the read-out process, causing the exposure time to vary from one portion of the image to another.

The image capture mode is selected by the photographer. When the photographer wishes to change the image capture mode, he or she interacts with user input 150 (FIG. 1) causing host CPU 165 to store values representing the photographer's selection in registers 144. In one embodiment, the registers 144 contain data for a plurality of exposure regions. Each exposure region can include a bottom line of the region and an exposure period, with the first exposure region starting at line zero and each successive exposure region starting at the line after the bottom line of the previous exposure region.

Figure 4A:
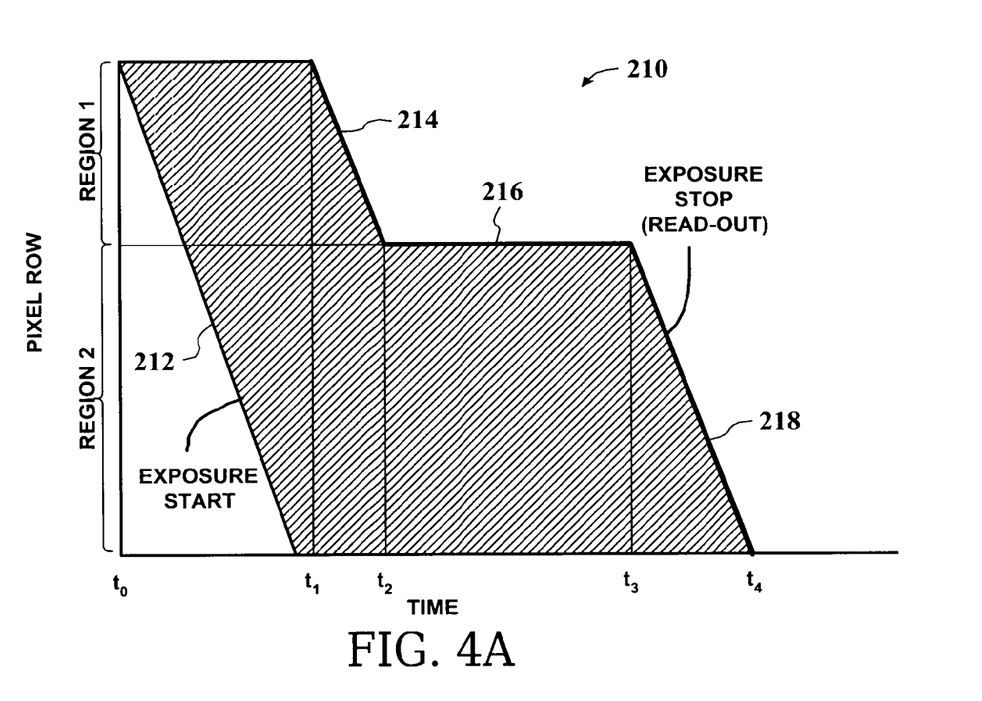
FIGS. 4A and 4B show time graphs illustrating the timing for image capture of successive rows of image data.

In one embodiment, the exposure times for each exposure region is varied by pausing the clock signal sent to imaging module 110. FIG. 4A shows an exemplary graph 210 illustrating such a mechanism. In graph 210, a position along the vertical axis identifies a particular row of sensors in the image sensor, with the top most line of the image sensor being positioned at the top end of the vertical axis. A position along the horizontal axis identifies a particular moment in time. The shaded area indicates exposure time. At time t0, each row of sensors is reset or released from reset at a start of an exposure period in a rolling manner as is known in the art starting from the top-most line and proceeding to the bottom-most line. Line 212 indicates the reset time for each row of sensors. At time $t_1$, read-out of the first row begins as indicated by line 214, and read-out of successive rows proceeds until time $t_2$. At time $t_2$, the read-out clock is paused as indicated by line 216 until time $t_3$. At time $t_3$, read-out resumes for the remaining portion of the frame, until time $t_4$. It can be seen how pausing the read-out clock from time $t_2$, to time $t_3$, causes region 2 (the lower portion of the frame) to have a longer exposure time than region 1, without requiring any modifications of existing off-the-shelf imaging modules.

Figure 4B:
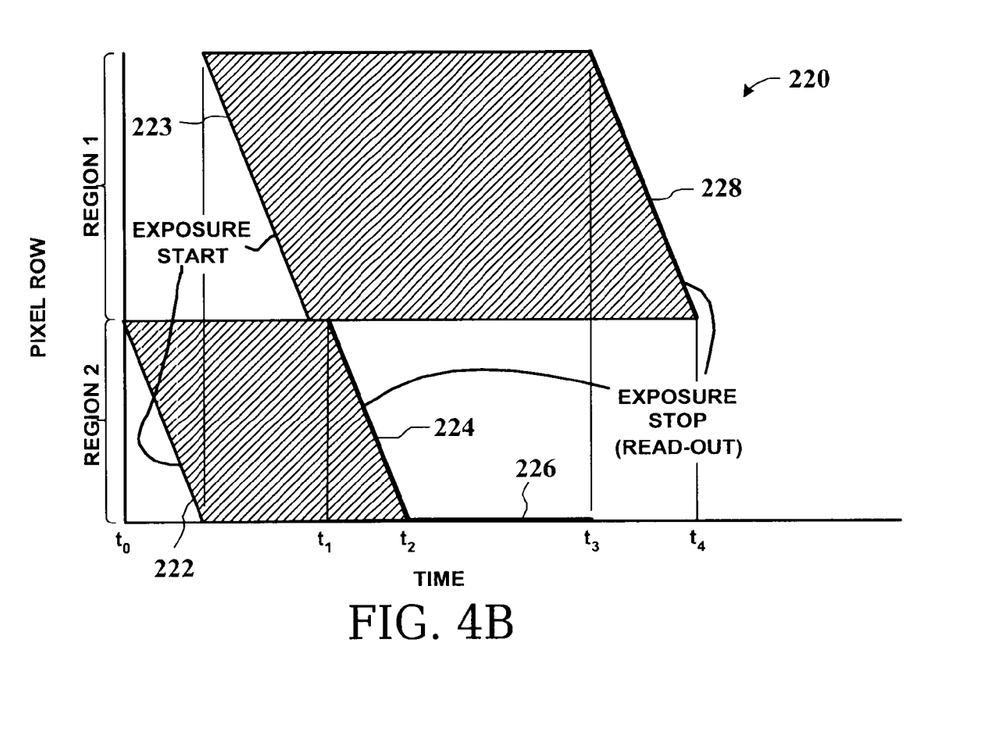

FIG. 4B shows a similar example, but with the upper portion of the image having the longer exposure time, e.g., as shown in FIG. 2. In this case, reset of the top-most row of sensors of the lower region (region 2) begins as indicated by line 222 and rolls to the top of the frame as shown by line 223. At time $t_1$, read-out begins as indicated by line 224 of the lower region, region 2. At time $t_2$, the read-out clock is paused as indicated by line 226, until time $t_3$. At time t3, the clock is resumed and the upper region, region 1, is read-out, as indicated by line 228.

It should be noted that, it is also possible to affect exposure times by manipulating the clock during exposure start, when the sensors are reset. For example, the exposure start line 212 in FIG. 4A could be paused at some time between $t_0$ and $t_1$ to delay the exposure start of subsequent rows. In addition, while the examples presented in FIGS. 4A and 4B present images having two distinct exposure regions, any number of exposure regions can be provided.

Figure 5:
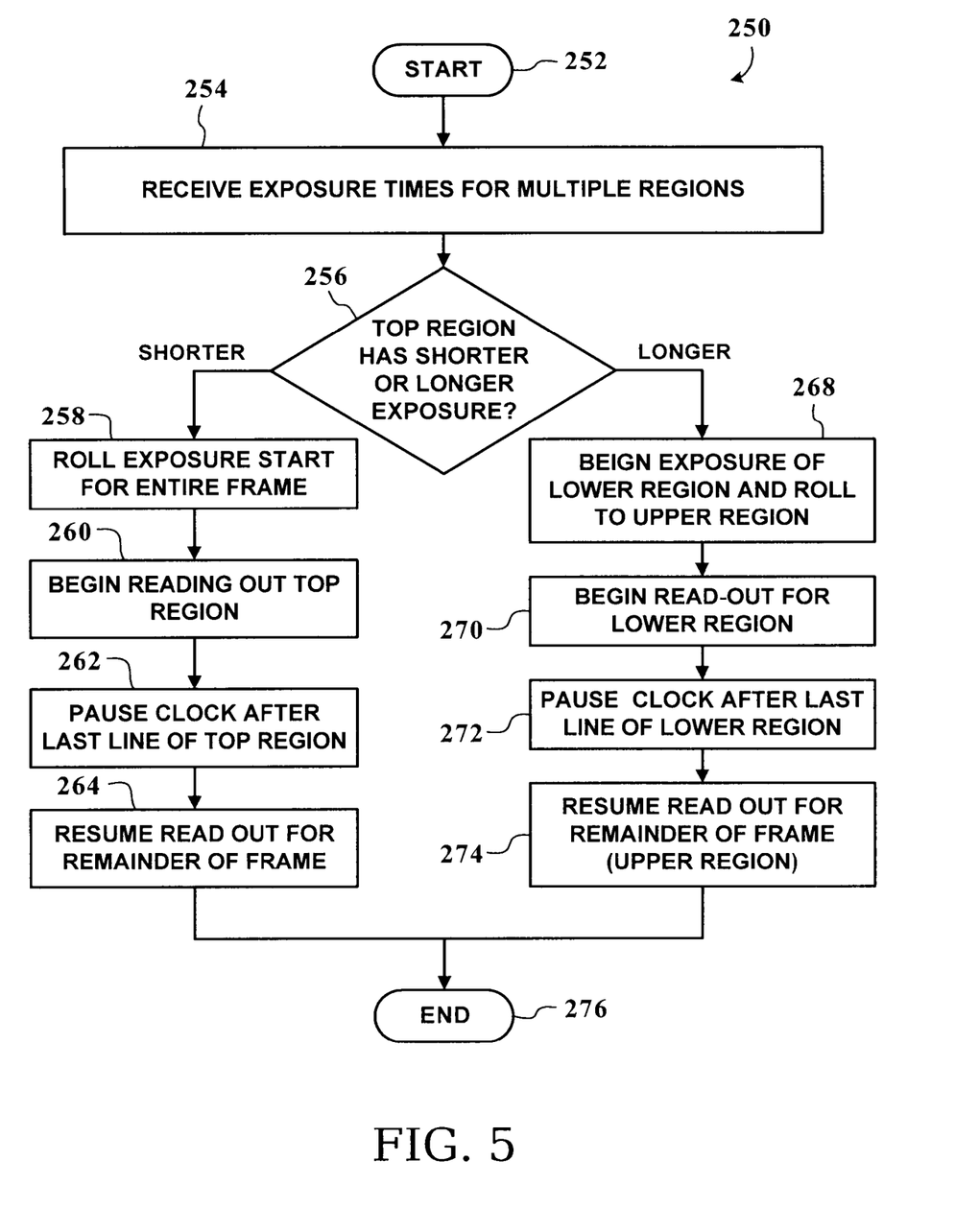
FIG. 5 shows a flowchart depicting an exemplary procedure for capturing an image having multiple exposure regions.

FIG. 5 shows a flowchart 250 depicting an exemplary procedure for generating a varying-exposure image. This procedure will be describe with reference to FIGS. 3, 4A, and 4B. The procedure begins as indicated by start block 252, and flows to operation 254, wherein exposure times and positions for the multiple regions are received. As mentioned above, in one embodiment, each multiple exposure region is identified with a bottom line and an exposure period. By comparing the exposure periods, exposure logic 146 can determine whether the top region has a longer exposure period than subsequent exposure regions. If the top region has a shorter exposure period, then the procedure flows to operation 258, otherwise, the procedure flows to operation 268.

In operation 258, the exposure start for each row in the frame is initiated, beginning with the top-most row as shown by line 212 in FIG. 4A. The procedure then proceeds to operation 260. At the appropriate time, image data from the top region is read-out as shown by line 214 in FIG. 4A. The procedure then proceeds to operation 262. In operation 262, after the last line of the top region is read out, the clock is paused, as shown by line 216 in FIG. 4A. In one embodiment, the clock is paused by changing a select signal to multiplexer 152 to select a zero value (e.g., ground) as shown in FIG. 3. This prevents the clock signal from reaching imaging module 110, while allowing the exposure logic to count clock cycles until the appropriate time to restart the read-out of image data.

In operation 264, at the appropriate time, depending on register value data 144 as described above, the clock is resumed and the remainder of the frame is read-out as shown by line 218 in FIG. 4A. If additional exposure regions are present, each has an exposure period modified in the same way as described above, by pausing and resuming clock signals.

In the case where the top region has a longer exposure region, the procedure proceeds from operation 256 to operation 268. In operation 268, exposure of the lower region is begun by resetting each row in turn as shown by line 222 in FIG. 4B. The resetting rolls to the top of the frame as shown by line 223 in FIG. 4B. Next, in operation 270, the read-out for the lower region begins as shown by line 224 in FIG. 4B. After reading out the lower region, the procedure flows to operation 272 wherein the clock is paused as shown by line 226 of FIG. 4B. As mentioned above, one possible mechanism for pausing the clock is by switching a multiplexer to a zero input as shown in FIG. 3. The procedure flows to operation 274 wherein, at the appropriate time, read-out of the upper region is resumed, as shown by line 228 in FIG. 4B. The procedure then ends as indicated by end block 276.

Use of clock-signal manipulation as described above allows exposure settings for arbitrarily selected regions of the frame to be varied without requiring any modification of the imaging module.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for obtaining an image having a plurality of exposure regions, the method comprising:
    exposing a first region of an image sensor and a second region of the image sensor to a scene, the exposing comprising releasing a matrix of light sensors from reset;
    reading out first image data from the image sensor for a first region of the image using a clock signal;
    pausing the clock signal to the image sensor after the reading out of the first image data;
    resuming the clock signal to the image sensor; and
    reading out second image data from the image sensor for a second region of the image.

2. The method of claim 1, wherein the exposing of the second region of the image continues during the pausing of the cock signal.

3. The method of claim 1, wherein the first region of the image is located closer to the top of the image than the second region of the image.

4. The method of claim 1, wherein the first region of the image is located closer to the bottom of the image than the second region of the image.

5. The method of claim 1, wherein the pausing of the clock signal comprises passing the clock signal through a multiplexer and changing a select signal to the multiplexer from the clock signal input to an input connected to ground.

6. The method of claim 1, further comprising:
    receiving an upper region exposure time and a lower region exposure time;
    determining whether the upper region exposure time is longer than the lower region exposure time;
    designating the first region as the lower region when the upper region has a longer exposure time than the lower region; and
    designating the first region as the upper region when the upper region does not have a longer exposure time than the lower region.

7. A graphics controller for obtaining an image having a plurality of exposure regions, the graphics controller comprising:
    registers for holding values identifying exposure times for a first region of the image and a second region of the image;
    a clock generating a clock signal, the clock signal being suitable for input to an imaging module;
    a camera interface for reading out image data from the imaging module for the first region of the image; and
    exposure logic for pausing the clock signal after the reading out image data corresponding to the first region and for resuming the clock signal, the pausing and resuming being responsive to the values held by the registers, the pausing and resuming causing each of the first and second regions to have the exposure times identified by the values in the registers.

8. The graphics controller of claim 7, wherein the first region of the image is located closer to the top of the image than the second region of the image.

9. The graphics controller of claim 7, wherein the first region of the image is located closer to the bottom of the image than the second region of the image.

10. The graphics controller of claim 7, further comprising a multiplexer, the exposure logic pausing the clock signal by changing a select signal of the multiplexer to switch the multiplexer from a clock signal input to an grounded input, the clock signal being connected to the clock signal input.

11. The method of claim 7, wherein the register values contain an upper region exposure time and a lower region exposure time, the exposure logic determining whether the upper region exposure time is longer than the lower region exposure time, wherein the exposure logic designates the first region as the lower region when the upper region has a longer exposure time than the lower region and designates the first region as the upper region when the upper region does not have a longer exposure time than the lower region.

12. An imaging device, the imaging device comprising:
a graphics controller comprising a plurality of registers;
an imaging module;
a user interface;
a host central processor unit (CPU), the host CPU receiving user input via user interaction with the user interface, the user input designating exposure times for a first exposure region and a second exposure region, the first and second exposure regions being portions of an image to be captured, the host CPU storing values corresponding to the exposure times in the registers of the graphics controller, the graphics controller further comprising a clock generating a clock signal, the clock signal being provided to the imaging module, a camera interface for reading out image data from the imaging module, and exposure logic, the exposure logic pausing the clock signal after reading out image data for the first exposure region and resuming the clock signal after a period of time, the pausing and resuming causing each of the first and second exposure regions to have the exposure times identified by the values in the registers; and
memory for storing the image data.

13. The imaging device of claim 12, wherein the first region of the image is located closer to the top of the image than the second region of the image.

14. The imaging device of claim 12, wherein the first region of the image is located closer to the bottom of the image than the second region of the image.

15. The imaging device of claim 12, wherein the graphics controller further comprises a multiplexer, the exposure logic pausing the clock signal by changing a select signal of the multiplexer to switch the multiplexer from a clock signal input to an grounded input, the clock signal being connected to the clock signal input, and an output of the multiplexer being in communication with the imaging module.

16. The method of claim 12, wherein the register values contain an upper region exposure time and a lower region exposure time, the exposure logic determining whether the upper region exposure time is longer than the lower region exposure time, wherein the exposure logic designates the first region as the lower region when the upper region has a longer exposure time than the lower region and designates the first region as the upper region when the upper region does not have a longer exposure time than the lower region.

\* \* \* \* \*

UNITED STATES PATENT AND TRADEMARK OFFICE
CERTIFICATE OF CORRECTION

| | | |
|---|---|---|
| PATENT NO. | : 7,565,077 B2 | Page 1 of 1 |
| APPLICATION NO. | : 11/419280 | |
| DATED | : July 21, 2009 | |
| INVENTOR(S) | : Barinder Singh Rai et al. | |

It is certified that error appears in the above-identified patent and that said Letters Patent is hereby corrected as shown below:

Title page:

(*)   Notice:

Please delete "This patent is subject to a terminal disclaimer".

Signed and Sealed this

Third Day of November, 2009

David J. Kappos
*Director of the United States Patent and Trademark Office*